United States Patent
Hurtado et al.

(10) Patent No.: US 11,732,837 B2
(45) Date of Patent: Aug. 22, 2023

(54) CLIP SYSTEM FOR SECURING AN INSULATION BLANKET TO A FRAME

(71) Applicant: THE BOEING COMPANY, Chicago, IL (US)

(72) Inventors: Joe L. Hurtado, Easley, SC (US); Chau T. Le, Chino Hills, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/546,114

(22) Filed: Dec. 9, 2021

(65) Prior Publication Data
US 2023/0184373 A1    Jun. 15, 2023

(51) Int. Cl.
| | |
|---|---|
| F16B 2/02 | (2006.01) |
| F16B 2/12 | (2006.01) |
| F16M 13/02 | (2006.01) |
| B64C 1/40 | (2006.01) |

(52) U.S. Cl.
CPC ............ F16M 13/02 (2013.01); B64C 1/403 (2013.01); *F16B 2/02* (2013.01); *F16B 2/12* (2013.01)

(58) Field of Classification Search
USPC ............ 248/229.12, 229.14, 229.15, 229.16, 248/229.1, 229.2, 229.22, 229.24, 229.25; 269/43, 45, 6
See application file for complete search history.

(56) References Cited

U.S. PATENT DOCUMENTS

| | | | | |
|---|---|---|---|---|
| 4,078,781 | A * | 3/1978 | Fraser ..................... | B25B 5/102 269/171 |
| 4,468,841 | A * | 9/1984 | Herington ............ | F16M 11/041 24/67.5 |
| 4,590,727 | A | 5/1986 | Ghahremani | |
| 4,646,452 | A * | 3/1987 | Mazzucchelli ....... | G09F 3/0305 24/522 |
| 5,584,457 | A * | 12/1996 | Fawcett .................. | F21V 23/04 362/802 |
| 7,191,990 | B2 | 3/2007 | Hutter, III | |
| 2008/0189920 | A1* | 8/2008 | Toombs .................... | F16B 2/12 24/604 |
| 2015/0292535 | A1* | 10/2015 | Albin ..................... | A44B 11/16 24/68 A |
| 2016/0348835 | A1* | 12/2016 | Blalock ..................... | A45F 5/00 |
| 2019/0390692 | A1* | 12/2019 | Li ......................... | F16M 11/041 |

FOREIGN PATENT DOCUMENTS

| | | |
|---|---|---|
| EP | 2293977 | 10/2012 |
| NO | 125545 | 9/1972 |

OTHER PUBLICATIONS

Extended European Search Report for EP 22212362.2-1015, dated Apr. 6, 2023.

* cited by examiner

*Primary Examiner* — Alfred J Wujciak
(74) *Attorney, Agent, or Firm* — The Small Patent Law Group LLC; Joseph M. Butscher (57) ABSTRACT

A clip system is configured to secure an insulation blanket to a frame. The clip system includes a first clamp member including an adjustment arm and a first engagement arm, and a second clamp member including a sleeve and a second engagement arm. The sleeve is configured to adjustably retain the adjustment arm to allow the first clamp member and the second clamp member to be moveably adjusted. The first engagement arm and the second engagement arm are configured to securely clamp portions of the insulation blanket and the frame therebetween.

20 Claims, 6 Drawing Sheets

CLIP SYSTEM FOR SECURING AN INSULATION BLANKET TO A FRAME

FIELD OF THE DISCLOSURE

Examples of the present disclosure generally relate a clip system, such as can be used to secure an insulation blanket to a frame or other such structure within a vehicle, such as a commercial aircraft.

BACKGROUND OF THE DISCLOSURE

A vehicle, such as a commercial aircraft, includes numerous components that are secured to one another. For example, stringers or frames are secured to outer skins, and thereby form portions of a fuselage, for example. Various components may be secured to the frames. Insulation blankets can be secured to various structures within the aircraft. For example, an insulation blanket can be secured to a frame.

Typically, stainless steel spring clips are used to secure an insulation blanket to a frame. Such stainless steel spring clips are generally sized and shaped to fit around a particular type of structure. As an example, a particular spring clip is sized and shaped to fit around a Z-shaped section station frame (a "Z frame"). Before spring clips are installed, insulation blankets are positioned on a Z frame. An individual uses a specialized tool to assist in the opening of the spring clip, and also to engage the spring clip around the Z frame.

However, the specialized tool may not be readily available at a particular worksite. Further, certain individuals may opt not to use the specialized tool. For example, an individual may opt to use a mallet-type tool to tap or strike the spring clip in place, which can potentially damage the spring clip. Additionally, using the specialized tool to install each spring clip around a Z frame is time and labor intensive. For example, a commercial aircraft can include hundreds, if not thousands, of spring clips that are secured to various structures.

SUMMARY OF THE DISCLOSURE

A need exists for an effective and efficient clip system that is configured to quickly and easily mount to a structure, such as a Z frame within a commercial aircraft. Further, a need exists for a clip system that can be secured to a structure without the need for a separate and distinct tool.

With those needs in mind, certain examples of the present disclosure provide a clip system configured to secure an insulation blanket to a frame. The clip system includes a first clamp member including an adjustment arm and a first engagement arm, and a second clamp member including a sleeve and a second engagement arm. The sleeve is configured to adjustably retain the adjustment arm to allow the first clamp member and the second clamp member to be moveably adjusted. The first engagement arm and the second engagement arm are configured to securely clamp portions of the insulation blanket and the frame therebetween.

In at least one example, the first clamp member and the second clamp member are integrally molded and formed as a single piece. In at least one example, the first clamp member and the second clamp member are formed of plastic.

In at least one example, the adjustment arm includes a first ratchet surface. The sleeve includes a second ratchet surface. The first ratchet surface engages the second ratchet surface.

The clip system can also include a lock moveably secured in relation to a recess of the sleeve over a portion of the adjustment arm.

In at least one example, the first engagement arm mirrors the second engagement arm. In at least one example, each of the first engagement arm and the second engagement arm includes an extension segment, a curved segment inwardly curving from the extension segment, and an engaging segment extending from the curved segment opposite from the extension segment. The engaging segment can be parallel to the extension segment.

The clip system can also include a lanyard coupled to the first clamp member and the second clamp member.

Certain examples of the present disclosure provide a method for securing an insulation blanket to a frame with a clip system. The method includes adjustably retaining an adjustment arm of a first clamp member within a sleeve of a second clamp member, wherein said adjustably retaining allows the first clamp member and the second clamp member to be moveably adjusted; and securely clamp portions of the insulation blanket and the frame between a first engagement arm of the first clamp member and a second engagement arm of the second clamp member.

Certain examples of the present disclosure provide a vehicle including a frame, an insulation blanket coupled to the frame, and a clip system securing the insulation blanket to the frame, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a clip system, which can be formed of plastic. The clip system can be integrally molded as a single piece. The clip system can include a first or male clamp member coupled to a second or female clamp member. The first clamp member can be tethered to the second clamp member, such as via a molded-in lanyard.

In at least one example, the clip system is configured to secure to different sized Z frames, such as within a commercial aircraft. The clip system is adjustable. In particular, the first clamp member and the second clamp member can be moved relative to one another to fit to different sized structures, such as different sized Z frames. Unlike stainless steel clips, the clip system can be secured to a structure by hand, without the need for a separate and distinct tool.

The clip system includes the adjustable first clamp member and the second clamp member, and can also include a quick-release feature that allows individuals to install and remove the clamp assembly without a specialized tool. Because the clip system can be formed of plastic, the clip system is less susceptible to fracturing and corrosion (in contrast to metal spring clips).

In at least one example, the first clamp member and the second clamp member are shaped to adjustably receive a Z-shaped portion of an aircraft frame while sandwiching an insulation blanket to the frame. A locking mechanism ensures the two clip bodies remain locked in place.

Figure 1:
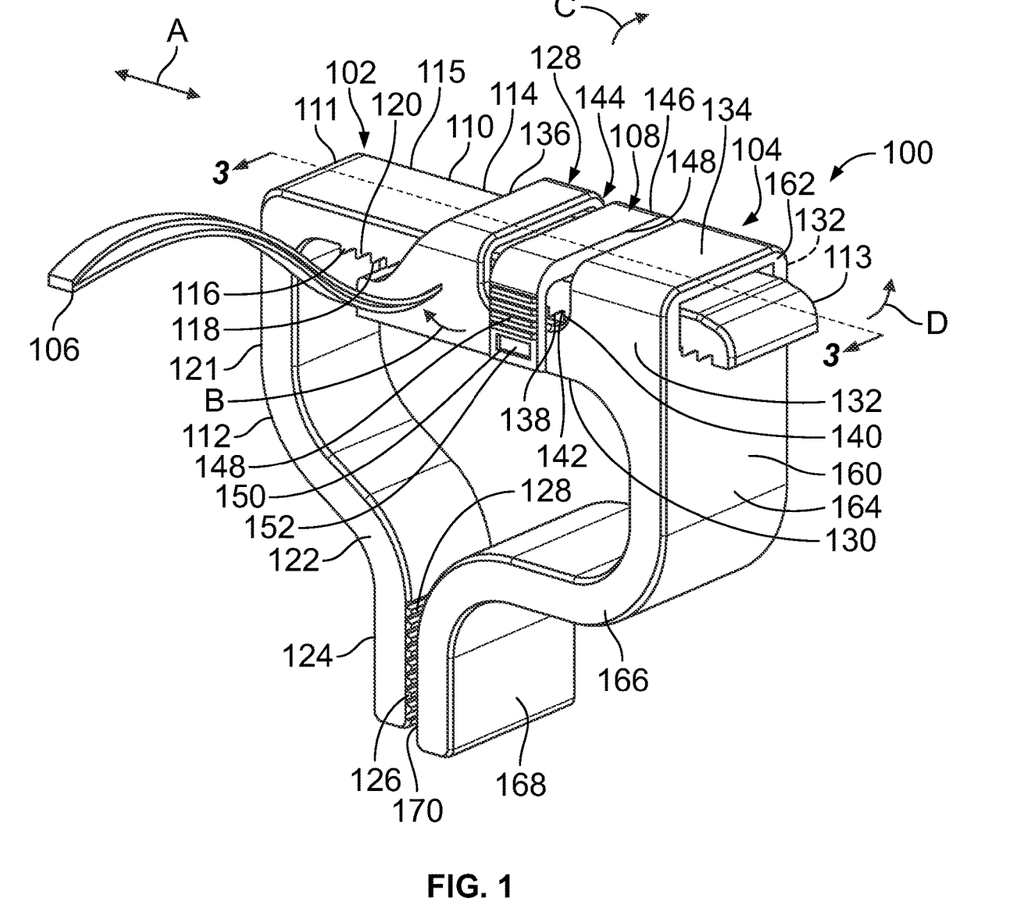
FIG. 1 illustrates an isometric front view of a clip system, according to an example of the present disclosure.

FIG. 1 illustrates an isometric front view of a clip system 100, according to an example of the present disclosure. The clip system 100 includes a male or first clamp member 102 adjustably coupled to a female or second clamp member 104. In at least one example, a lanyard 106 tethers the first clamp member 102 to the second clamp member 104. A lock 108 ensures that the first clamp member 102 remains secured to the second clamp member 104. Alternatively, the clip system 100 may not include the lanyard 106 and/or the lock 108.

The clip system 100 can be integrally formed and molded as a single piece. For example, the clip system 100 can be integrally formed and molded as a single piece of injection-molded plastic. In particular, the first clamp member 102, the second clamp member 104, the lanyard 106, and the lock 108 can be integrally formed and molded together. Flash connections can be formed between the components and broken after the clip system 100 is formed and molded, such that the first clamp member 102 can be adjustably moved relative to the second clamp member 104, for example.

In at least one example, the first clamp member 102 and the second clamp member 104 are bi-directionally adjustable in a linear manner. For example, the first clamp member 102 and the clamp member 104 can be linearly adjusted in directions denoted by arrows A. The bi-directional, linear adjustment of the first clamp member 102 in relation to the second clamp member 104 provides adaptable and increased clamping force to better secure an insulation blanket to a frame, for example.

The first clamp member 102 includes an adjustment arm 110 connected to an engagement arm (for example, a first engagement arm) 112. The adjustment arm 110 includes a root 111 that connects to a distal tip 113 through an intermediate body 115. A first surface 114 opposite from a second surface 116 extends along the intermediate body 115. The first surface 114 can be flat and smooth. The second surface 116 includes a ratchet surface (for example, a first ratchet surface) 118 including a plurality of ratchet teeth 120.

The engagement arm 112 includes an extension segment 121 extending from the root 111, such as at a right angle. Optionally, the extension segment 121 can connect to the root 111 at various other angles. A curved segment 122 inwardly curves from the extension segment 121 toward the second clamp member 104. An engaging segment 124 extends from the curved segment 122, opposite from the extension segment 121. The engaging segment 124 can be parallel to the extension segment 121. As shown, the engaging segment 124 is inboard in relation to the extension segment 121. That is, the engaging segment 124 is closer to the second clamp member 104 than the extension segment 121. An interior surface 126 of the engaging segment 124 can include gripping protuberances 126, such as ridges, embossments, or the like.

The second clamp member 104 includes a sleeve 128 that is configured to receive and adjustably retain the adjustment arm 110 of the first clamp member 102. The sleeve 128 includes a base 130, side walls 132, and an enclosing wall 134 opposite from the base 130. A receiving end 136 of the sleeve 128 includes an opening into which the adjustment arm 110 extends.

An interior surface 138 of the base 130 includes a ratchet surface (for example, a second ratchet surface) 140 including a plurality of ratchet teeth 142. The ratchet surface 140 is configured to engage the ratchet surface 118 of the first clamp member 102 to lock the first clamp member 102 at a desired position relative to the second clamp member 104.

In at least one example, a recess 144 is formed in the sleeve 128. For example, the recess 144 extends between the side walls 132 and the enclosing wall 134. A lock (for example, a secondary lock) 146 is disposed within the recess 144. The lock 146 is moveably secured in relation to the recess 144 (for example, the lock 146 is configured to move into and out of the recess 144) of the sleeve 128 over a portion of the adjustment arm 110. The lock 146 includes a strap 148 that extends over the recess 144, and a tab 149 that extends from the strap 148 toward the base 130. The tab 149 includes an opening 150 that receives a protuberance 152 (such as a barb, post, block, or the like) extending from the base 130 and/or a side wall 132. An end of the lock 146 opposite from the tab 149 can include another tab that secures to an opposite side of the sleeve 128, or can pivotally couple to the opposite side of the sleeve 128.

An engagement arm (for example, a second engagement arm) 160 extends from an end 162 of the sleeve 128 opposite from the receiving end 136. As shown, the engagement arm 160 can mirror the engagement arm 112. The engagement arm 160 includes an extension segment 164 extending from the end 162, such as at a right angle. Optionally, the extension segment 164 can connect to the end 162 at various other angles. A curved segment 166 inwardly curves from the extension segment 164 toward the first clamp member 102. An engaging segment 168 extends from the curved segment 166, opposite from the extension segment 164. The engaging segment 168 can be parallel to the extension segment 164. As shown, the engaging segment 168 is inboard in relation to the extension segment 164. That is, the engaging segment 168 is closer to the first clamp member 102 than the extension segment 164. An interior surface 170 of the engaging segment 168 can include gripping protuberances, such as ridges, embossments, or the like.

In operation, the first clamp member 102 and the second clamp member 104 are configured to be adjusted relative to one another in the directions of arrow A. In this manner, the clip system 100 can be adjusted to fit to various structures having different sizes and shapes, such as different sized Z frames.

The adjustment arm 110 can be moved inwardly and outwardly in relation to the sleeve 128 in the directions of arrows A. For example, an individual can move the adjustment arm 110 outwardly to accept a wider sized structure between the opposed engagement arms 112 and 160. The individual can then press the first clamp member 102 and the second clamp 104 toward one another to a desired clamping position. The ratchet surface 118 of the first clamp member 102 and the ratchet surface 140 of the second clamp member 104 engage one another to prevent the first clamp member 102 and the second clamp member 104 from spreading back open.

In order to adjust the clip system 100 to a wider position, the tab 149 of lock 146 can be pulled off the protuberance 152 in the direction of arc B, and the lock 146 can then be pivoted off the adjustment arm 110 in the recess 144 in the direction of arc C. As such, the lock 146 no longer constrains upward motion of the adjustment arm 110 relative to the sleeve 128. Thus, an individual can then lift the distal tip 113 in the direction of arc C so that the ratchet surface 118 of the first clamp member 102 disengages from the ratchet surface 140 of the second clamp member 104, thereby allowing the individual to spread open the first clamp member 102 in relation to the second clamp member 104.

As described herein, the clip system 100 is configured to secure an insulation blanket to a frame. The clip system 100 includes the first clamp member 102 including the adjustment arm 110 and the (first) engagement arm 112. The clip system 100 also includes the second clamp member 104 including the sleeve 128 and the (second) engagement arm 160. The sleeve 128 is configured to adjustably retain the adjustment arm 110 to allow the first clamp member 102 and the second clamp member 104 to be moveably adjusted. The (first) engagement arm 112 and the (second) engagement arm 160 are configured to securely clamp portions of the insulation blanket and the frame therebetween.

Figure 2:
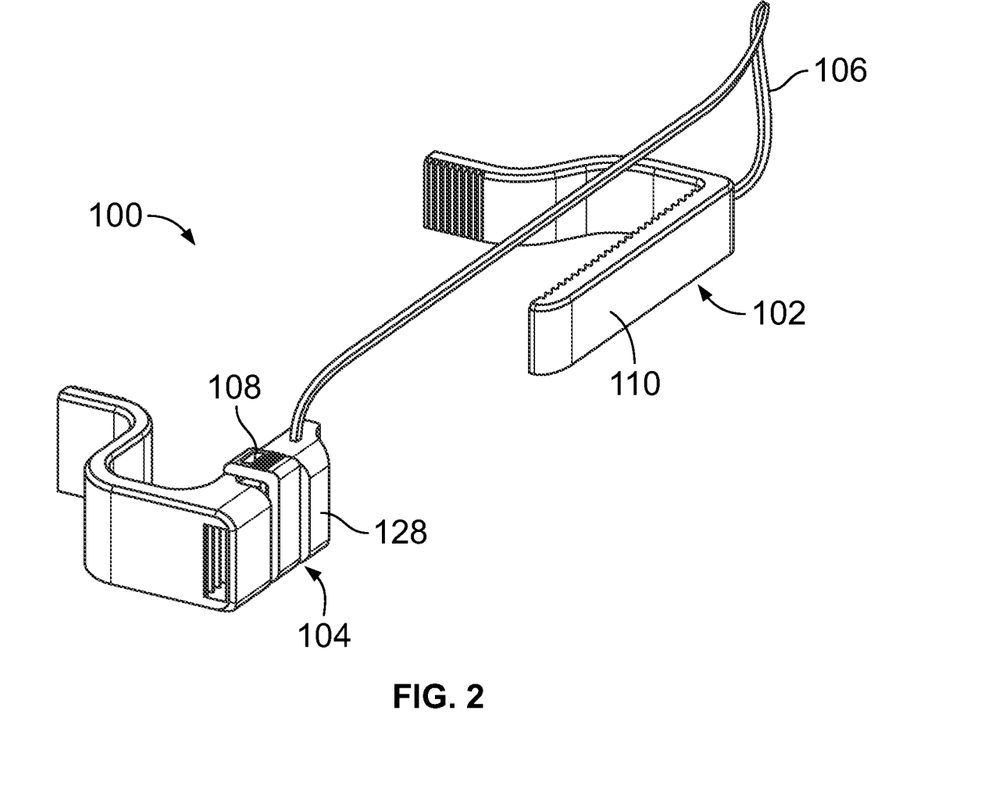
FIG. 2 illustrates an isometric view of the clip system in an expanded position, according to an example of the present disclosure.

FIG. 2 illustrates an isometric view of the clip system 100 in an expanded position, according to an example of the present disclosure. As shown, the first clamp member 102 can be separated from the second clamp member 104, such that the adjustment arm 110 is removed from the sleeve 128. The lanyard 106 is secured to both the first clamp member 102 and the second clamp member 104, thereby ensuring that the clip system 100 remains intact and together. In particular, the lanyard 106 prevents the first clamp member 102 and the second clamp member 104 from uncoupling (and potentially being lost).

Figure 3:
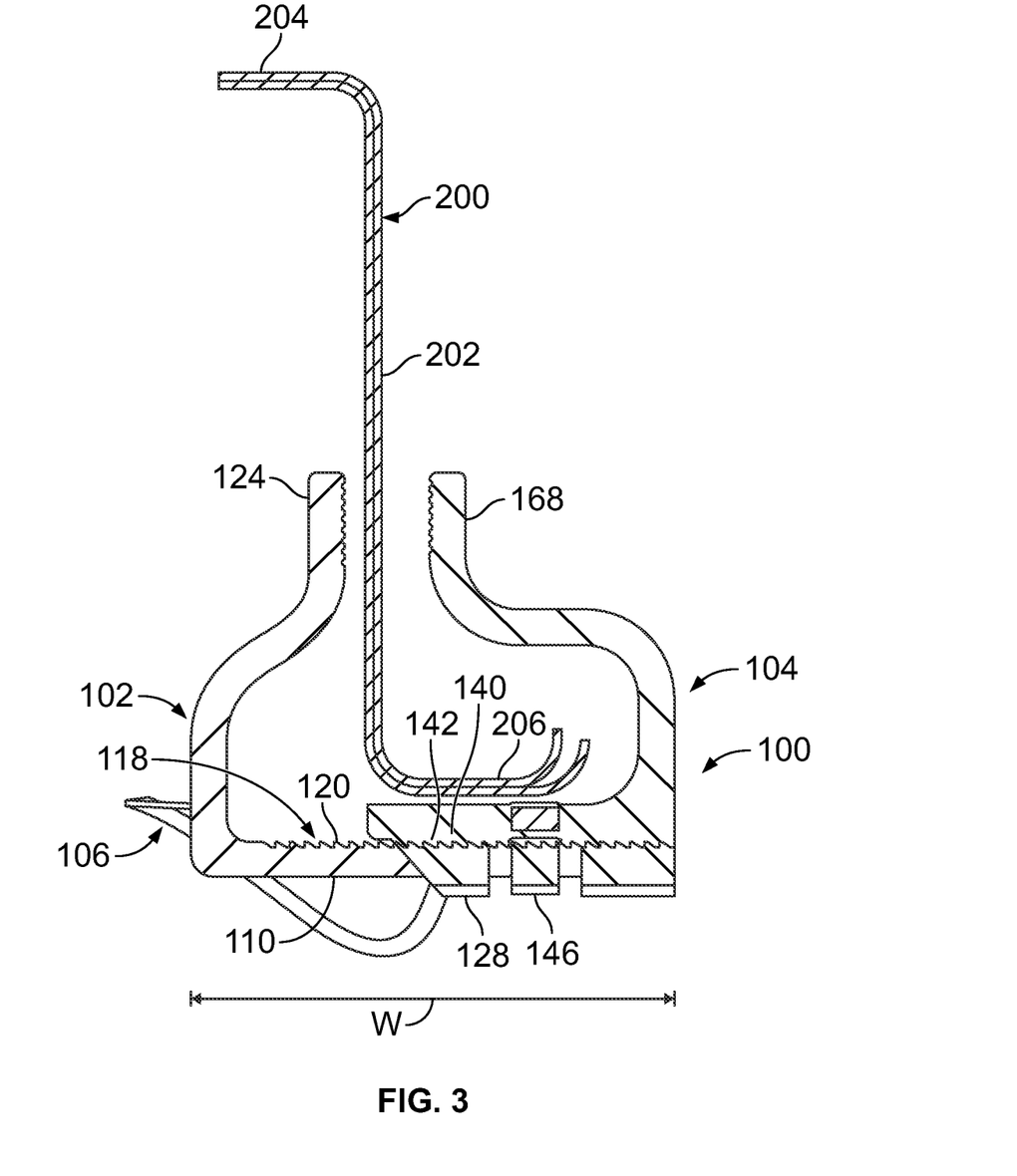
FIG. 3 illustrates a cross-sectional view of the clip system through line 3-3 of FIG. 1 secured to a structure, according to an example of the present disclosure.
Figure 4:
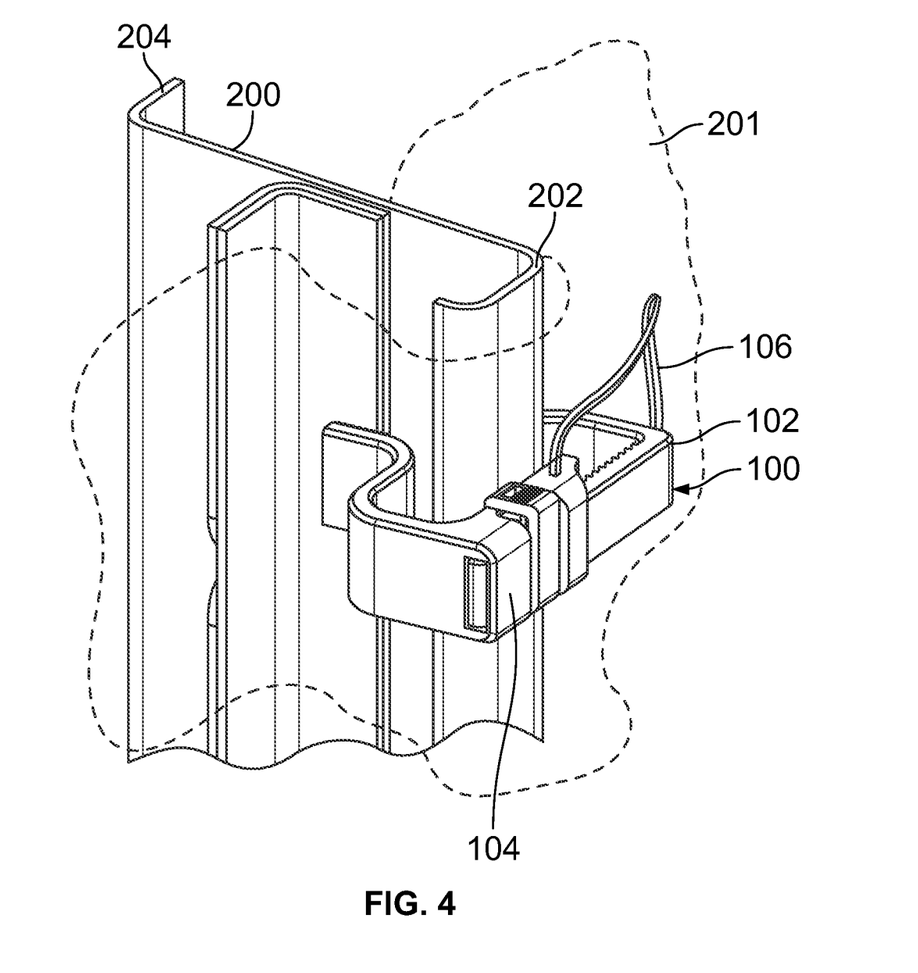
FIG. 4 illustrates an isometric view of the clip system securing an insulation blanket to the structure, according to an example of the present disclosure.

FIG. 3 illustrates a cross-sectional view of the clip system 100 through line 3-3 of FIG. 1 secured to a structure 200, according to an example of the present disclosure. FIG. 4 illustrates an isometric view of the clip system 100 securing an insulation blanket 201 to the structure 200, according to an example of the present disclosure.

In at least one example, the structure 200 is a frame within a commercial aircraft. As a further example, the structure 200 is a Z frame having a main segment 202 between a first end segment 204 and a second end segment 206 that extends in an opposite direction from the first end segment 204.

The clip system 100 is configured to be adjusted to fit to a particular size and shape of the structure 200, as described above. An insulation blanket can be sandwiched between the structure 200 and the clip system 100. As such, the clip system 100 can be adjusted to a desired width W, as described above. The first clamp member 102 and the second clamp member 104 can then be squeezed together, as described above, to securely clamp the insulation blanket to the structure 200, such that the opposed ratchet surfaces 118 and 140 prevent the clip system 100 from undesirably spreading open.

The opposed engaging segments 124 and 168 of the first clamp member 102 and the second clamp member 104, respectively, compressively sandwich the insulation blanket 201 to the structure 200. In particular, a portion of the insulation blanket 201 and a portion of the structure 200 is sandwiched between the engaging segment 124 and the engaging segment 168.

Figure 5:
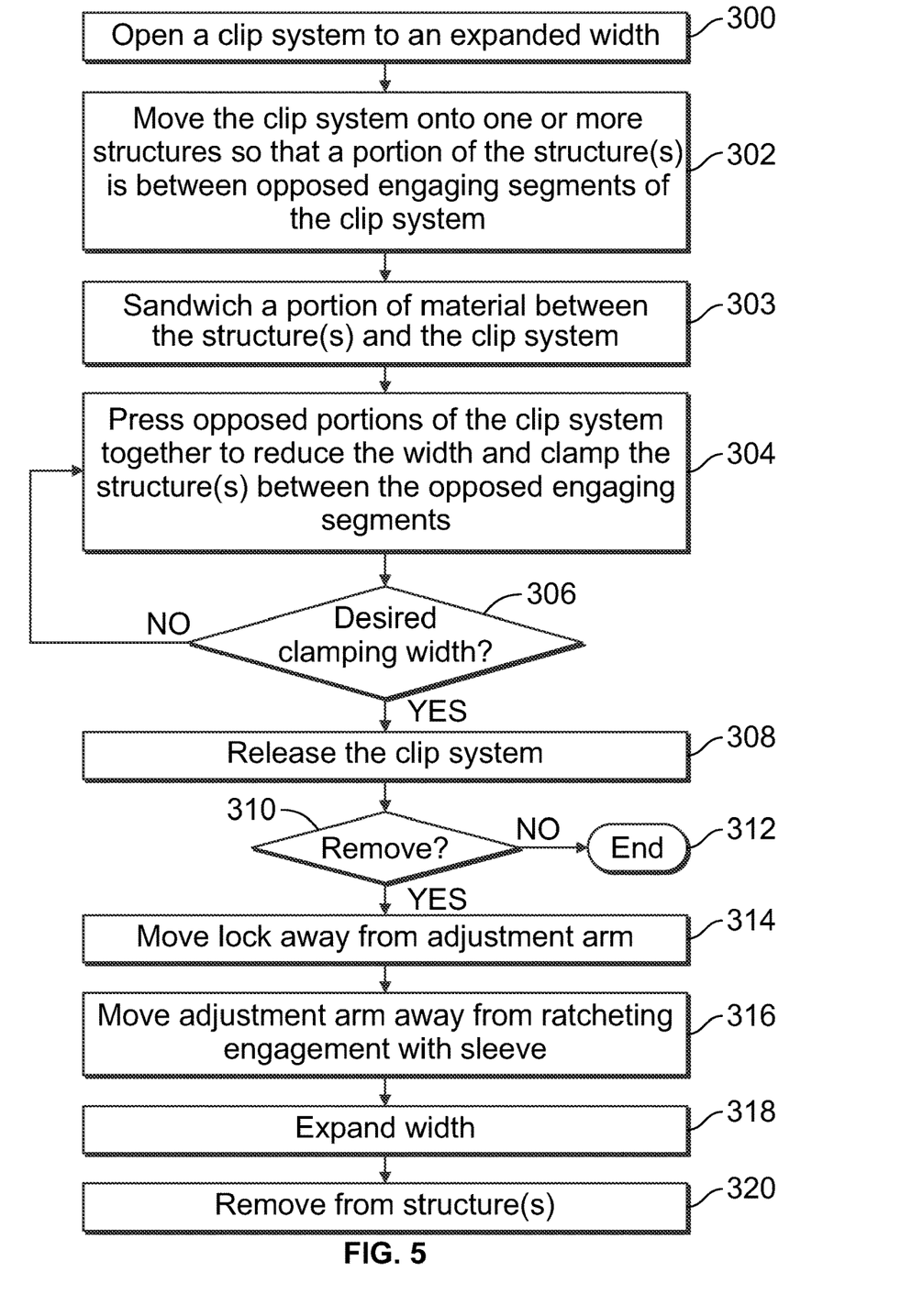
FIG. 5 illustrates a flow chart of a method for securing a clip system to one or more structures, according to an example of the present disclosure.

FIG. 5 illustrates a flow chart of a method for securing a clip system to one or more structures, according to an example of the present disclosure. Referring to FIGS. 1-5, at 300, the clip system 100 is opened to an expanded width. For example, the first clamp member 102 and the second clamp member 104 can be spread apart to a width that allows a portion of structure(s) to be positioned between the opposed engaging segments 124 and 168 of the clip system 100.

At 302, the clip system 100 is then moved onto the structure(s) so that a portion of the structure(s) is between the opposed engaging segments 124 and 168. At 304, an individual then presses opposed portions (for example, the first clamp member 102 and the second clamp member 104) together to reduce the width and clamp the structure(s) between the opposed engaging segments 124 and 168. At 303, a portion of a material (such as a portion of an insulation blanket) is sandwiched between the the structure(s) and the clip system 100.

At 306, the individual then determines if the desired clamping width is achieved. If not, the method returns to 304. If, however, the desired clamping width is achieved, the method proceeds from 306 to 308, at which the individual releases the clip system 100.

At 310, it is determined if the clamp system 100 is to be removed (such to be readjusted, or coupled to a different structure(s)). If not, the method ends at 312.

If, however, the clamp system 100 is to be removed at 310, the method proceeds to 314, at which the lock 146 is moved away from the adjustment arm 110 (for example, being pivoted upwardly from a locking position). At 316, the adjustment arm 110 is then moved away from ratcheting engagement with the sleeve 128 (for example, by the distal tip 113 being pivoted upward). At 318, with the adjustment arm 110 still away from ratcheting engagement with the sleeve 128, the width of the clip system 100 is expanded, such as by spreading apart the first clamp member 102 and the second clamp member 104. At 320, the clip system 100 is then removed from the structure(s).

Figure 6:
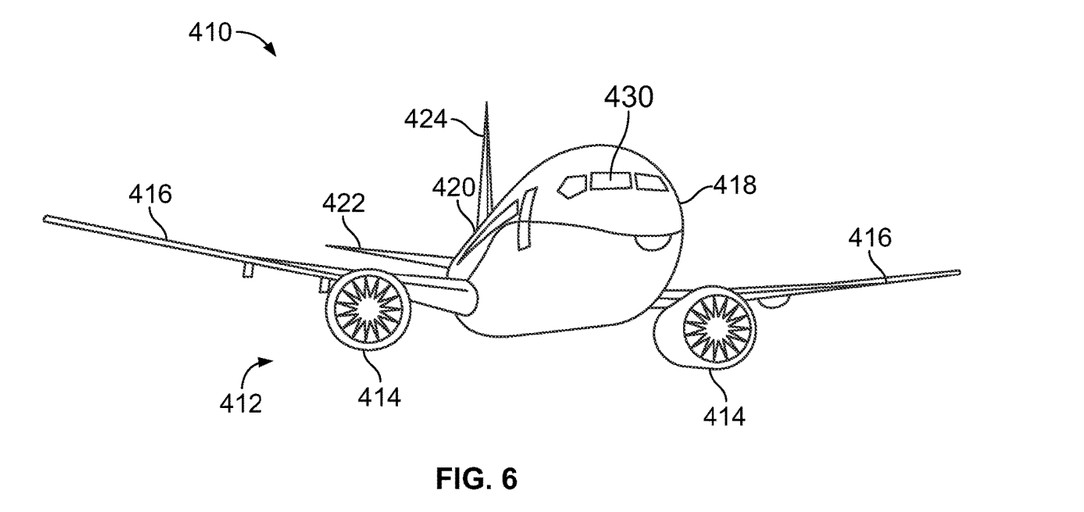
FIG. 6 illustrates a perspective front view of an aircraft, according to an example of the present disclosure.

FIG. 6 illustrates a perspective front view of an aircraft 410, according to an example of the present disclosure. The aircraft 410 includes a propulsion system 412 that includes engines 414, for example. Optionally, the propulsion system 412 may include more engines 414 than shown. The engines 414 are carried by wings 416 of the aircraft 410. In other embodiments, the engines 414 may be carried by a fuselage 418 and/or an empennage 420. The empennage 420 may also support horizontal stabilizers 422 and a vertical stabilizer 424.

The fuselage 418 of the aircraft 410 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. The systems and methods described herein can be used within the aircraft 410. For example, the clip system 100 described herein can be used to secure an insulation blanket to a Z frame within a portion of the aircraft 410, such as within the fuselage 418.

Alternatively, instead of an aircraft, examples of the present disclosure may be used with various other vehicles, such as automobiles, buses, locomotives and train cars, watercraft, and the like. Further, examples of the present disclosure may be used with respect to fixed structures, such as commercial and residential buildings.

Further, the disclosure comprises examples according to the following clauses:

Clause 1. A clip system configured to secure an insulation blanket to a frame, the clip system comprising:

a first clamp member including an adjustment arm and a first engagement arm; and a second clamp member including a sleeve and a second engagement arm, wherein the sleeve is configured to adjustably retain the adjustment arm to allow the first clamp member and the second clamp member to be moveably adjusted, and wherein the first engagement arm and the second engagement arm are configured to securely clamp portions of the insulation blanket and the frame therebetween.

Clause 2. The clip system of Clause 1, wherein the first clamp member and the second clamp member are integrally molded and formed as a single piece.

Clause 3. The clip system of Clauses 1 or 2, wherein the first clamp member and the second clamp member are formed of plastic.

Clause 4. The clip system of any of Clauses 1-3, wherein the adjustment arm comprises a first ratchet surface, wherein the sleeve comprises a second ratchet surface, and wherein the first ratchet surface engages the second ratchet surface.

Clause 5. The clip system of any of Clauses 1-4, further comprising a lock moveably secured in relation to a recess of the sleeve over a portion of the adjustment arm.

Clause 6. The clip system of any of Clauses 1-5, wherein the first engagement arm mirrors the second engagement arm.

Clause 7. The clip system of any of Clauses 1-6, wherein each of the first engagement arm and the second engagement arm comprises:

an extension segment;

a curved segment inwardly curving from the extension segment; and an engaging segment extending from the curved segment opposite from the extension segment.

Clause 8. The clip system of Clause 7, wherein the engaging segment is parallel to the extension segment.

Clause 9. The clip system of any of Clauses 1-8, further comprising a lanyard coupled to the first clamp member and the second clamp member.

Clause 10. A method for securing an insulation blanket to a frame with a clip system, the method comprising:

adjustably retaining an adjustment arm of a first clamp member within a sleeve of a second clamp member, wherein said adjustably retaining allows the first clamp member and the second clamp member to be moveably adjusted; and securely clamp portions of the insulation blanket and the frame between a first engagement arm of the first clamp member and a second engagement arm of the second clamp member.

Clause 11. The method of Clause 10, further comprising integrally molding and forming the first clamp member and the second clamp member as a single piece.

Clause 12. The method of Clauses 10 or 11, further comprising forming the first clamp member and the second clamp member of plastic.

Clause 13. The method of any of Clauses 10-12, further comprising engaging a first ratchet surface of the adjustment arm with a second ratchet surface of the sleeve.

Clause 14. The method of any of Clauses 10-13, further comprising moveably securing a lock in relation to a recess of the sleeve over a portion of the adjustment arm.

Clause 15. The method of any of Clauses 10-14, further comprising coupling a lanyard to the first clamp member and the second clamp member.

Clause 16. A vehicle comprising:

a frame;

an insulation blanket coupled to the frame; and a clip system securing the insulation blanket to the frame, the clip system comprising:

a first clamp member including an adjustment arm and a first engagement arm;

a second clamp member including a sleeve and a second engagement arm, wherein the sleeve is configured to adjustably retain the adjustment arm to allow the first clamp member and the second clamp member to be moveably adjusted, and wherein the first engagement arm and the second engagement arm are configured to securely clamp portions of the insulation blanket and the frame therebetween;

a lock moveably secured in relation to a recess of the sleeve over a portion of the adjustment arm; and a lanyard coupled to the first clamp member and the second clamp member.

Clause 17. The vehicle of Clause 16, wherein the first clamp member and the second clamp member are integrally molded and formed as a single piece, and wherein the first clamp member and the second clamp member are formed of plastic.

Clause 18. The vehicle of Clauses 16 or 17, wherein the adjustment arm comprises a first ratchet surface, wherein the sleeve comprises a second ratchet surface, and wherein the first ratchet surface engages the second ratchet surface.

Clause 19. The vehicle of any of Clauses 16-18, wherein the first engagement arm mirrors the second engagement arm.

Clause 20. The vehicle of any of Clauses 16-19, wherein each of the first engagement arm and the second engagement arm comprises:

an extension segment;

a curved segment inwardly curving from the extension segment; and an engaging segment extending from the curved segment opposite from the extension segment, wherein the engaging segment is parallel to the extension segment.

As described herein, examples of the present disclosure provide an effective and efficient clip system that is configured to quickly and easily mount to a structure, such as a Z frame within a commercial aircraft. Further, examples of the present disclosure provide a clip system that can be secured to a structure without the need for a separate and distinct tool.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A clip system configured to secure an insulation blanket to a frame, the clip system comprising:
   a first clamp member including an adjustment arm and a first engagement arm;
   a second clamp member including a sleeve and a second engagement arm, wherein the sleeve comprises a base, side walls, and an enclosing wall opposite from the base, wherein a recess is formed in the sleeve, wherein the recess extends through at least a portion of the enclosing wall and at least portions of both of the side walls, wherein the sleeve is configured to adjustably retain the adjustment arm to allow the first clamp member and the second clamp member to be moveably adjusted, and wherein the first engagement arm and the second engagement arm are configured to securely clamp portions of the insulation blanket and the frame therebetween; and
   a lock moveably secured in the recess of the sleeve over a portion of the adjustment arm, wherein the lock comprises a strap that extends across and over the recess between and through the at least a portion of the enclosing wall and the at least portion of both of the side walls.

2. The clip system of claim 1, wherein the first clamp member and the second clamp member are integrally molded and formed as a single piece.

3. The clip system of claim 1, wherein the first clamp member and the second clamp member are formed of plastic.

4. The clip system of claim 1, wherein the adjustment arm comprises a first ratchet surface, wherein the sleeve comprises a second ratchet surface, and wherein the first ratchet surface engages the second ratchet surface.

5. The clip system of claim 1, wherein the first engagement arm mirrors the second engagement arm.

6. The clip system of claim 1, wherein each of the first engagement arm and the second engagement arm comprises:
   an extension segment;
   a curved segment inwardly curving from the extension segment; and
   an engaging segment extending from the curved segment opposite from the extension segment.

7. The clip system of claim 6, wherein the engaging segment is parallel to the extension segment.

8. The clip system of claim 6, wherein an interior surface of the engaging segment comprises gripping protuberances.

9. The clip system of claim 1, further comprising a lanyard coupled to the first clamp member and the second clamp member.

10. The clip system of claim 9, wherein the first clamp member, the second clamp member, the lock, and the lanyard are integrally formed and molded together.

11. The clip system of claim 1, wherein the lock further comprise a tab that extends from the strap toward the base of the sleeve.

12. The clip system of claim 11, wherein the tab comprises an opening that receives a protuberance extending from an outer surface of one or both of the base or one of the side walls.

13. The clip system of claim 12, wherein an end of the lock opposite from the tab is pivotally coupled to one of the side walls.

14. The clip system of claim 12, wherein an end of the lock opposite from the tab includes another tab that secures to one of the side walls.

15. The clip system of claim 1, wherein the first clamp member and the second clamp member are configured to adjustably receive a Z-shaped portion of the frame.

16. The clip system of claim 1, wherein the first clamp member, the second clamp member, and the lock are integrally formed and molded as a single piece of injection-molded plastic.

17. The clip system of claim 1, wherein the first clamp member and the second clamp member are bi-directionally adjustable in a linear manner.

18. The clip system of claim 1, wherein the insulation blanket and the frame are within an aircraft.

19. The clip system of claim 1, wherein the frame is a Z frame having a main segment between a first end segment and a second end segment that extends in an opposite direction for the first end segment.

20. The clip system of claim 1, wherein the insulation blanket is configured to be sandwiched between the clip system and the frame.

* * * * *